United States Patent
Babcock et al.

(10) Patent No.: US 8,183,321 B2
(45) Date of Patent: May 22, 2012

(54) IMPACT MODIFIED POLYLACTIDE RESINS

(75) Inventors: Laura Mae Babcock, Plymouth, MN (US); David E. Henton, Jackson, WY (US); Fasil A. Tadesse, Burnsville, MN (US)

(73) Assignee: NatureWorks LLC, Minnetonka, MN (US)

( * ) Notice: Subject to any disclaimer, the term of this patent is extended or adjusted under 35 U.S.C. 154(b) by 205 days.

(21) Appl. No.: 12/445,287

(22) PCT Filed: Oct. 18, 2007

(86) PCT No.: PCT/US2007/022248
§ 371 (c)(1),
(2), (4) Date: Jan. 27, 2010

(87) PCT Pub. No.: WO2008/051443
PCT Pub. Date: May 2, 2008

(65) Prior Publication Data
US 2010/0144971 A1    Jun. 10, 2010

Related U.S. Application Data

(60) Provisional application No. 60/853,406, filed on Oct. 20, 2006.

(51) Int. Cl.
*C08L 51/00* (2006.01)
*C08L 67/04* (2006.01)
*C08G 63/08* (2006.01)

(52) U.S. Cl. ............................................. 525/64; 525/71
(58) Field of Classification Search .................. 525/64, 525/71
See application file for complete search history.

(56) References Cited

U.S. PATENT DOCUMENTS

| | | |
|---|---|---|
| 5,908,918 A | 6/1999 | Chen et al. |
| 6,090,892 A | 7/2000 | Ishida et al. |
| 2003/0038405 A1 | 2/2003 | Bopp et al. |
| 2003/0199628 A1 | 10/2003 | Weese et al. |
| 2004/0137243 A1 | 7/2004 | Gleason |
| 2005/0014011 A1 | 1/2005 | Oya |
| 2006/0101943 A1 | 5/2006 | Snow et al. |
| 2007/0055047 A1* | 3/2007 | Simon et al. .................. 528/487 |
| 2007/0276090 A1 | 11/2007 | Aoki et al. |
| 2008/0071008 A1* | 3/2008 | Smillie et al. ................. 523/201 |
| 2009/0018237 A1 | 1/2009 | Fujii et al. |

FOREIGN PATENT DOCUMENTS

| | | |
|---|---|---|
| WO | 2005/085352 A | 9/2005 |
| WO | 2005/123831 A | 12/2005 |

* cited by examiner

*Primary Examiner* — Jeffrey Mullis
(74) *Attorney, Agent, or Firm* — Gary C Cohn PLLC

(57) ABSTRACT

Polylactide resins are blended with core-shell rubber particles to improve impact strength. A good balance of impact strength and transparency is achieved when the rubber particles are distributed within the polymer matrix such that most of them exist as single particles or agglomerates having a diameter of 150 nanometers or more, and the number average size of the particles and agglomerates is not more than 210 nanometers.

12 Claims, No Drawings

IMPACT MODIFIED POLYLACTIDE RESINS

This application claims priority from U.S. Provisional Application No. 60/853,406, filed 20 Oct., 2006.

This invention relates to clear impact-modified polylactide resins.

Polylactide polymers (PLA, sometimes referred to as polylactic acid) are of increasing interest because they can be prepared from annually renewable resources such as corn sugars rather than oil or natural gas feedstocks. PLA resins are also capable of degrading rapidly under some composting conditions to regenerate carbon dioxide. The ability to compost these materials can provide more disposal options for these resins, compared to most other organic polymers. As a result, PLA resins are finding increasing uses in a variety of packaging applications. These packaging applications include a variety of rigid and semi-rigid articles such as "clamshell" containers, deli and other food service trays and bottles or other containers.

PLA resins have an inherent brittleness which can limit their use in some of these applications. A useful measure of impact strength is a Dart impact test, in which a weight is dropped onto a sample from varying heights to determine the energy needed to fracture or break a sample. PLA by itself exhibits an impact strength of about 1 foot-pound (1.36 Joules) on this test. Impact-modified PLA resins may have an impact strength of 4 foot-pounds (5.4 J) or greater. For many applications, an impact strength of from 4 to 20 foot-pounds (5.4-27 J) is desirable.

Therefore, various attempts have been made to modify PLA resins to make them less brittle, i.e., improve their impact strength. These approaches usually involve blending the PLA resin with other polymers or with various types of impact modifiers. These blends often exhibit significantly better impact strength than does PLA by itself.

Unfortunately, these impact-modified PLA blends tend to be quite opaque. This opacity makes the blends unsuitable for applications in which clarity is important, such as many "clamshell"-type deli and food service trays, and many types of bottles.

There have been attempts to solve the problem of opacity by carefully matching the refractive index of the impact modifier with that of the PLA resin (which for a PLA homopolymer is about 1.454). Such approaches are described, for example, in WO 2005/085352 and WO 2005/123831, which specify that the refractive index of the impact modifier should be within 0.005 or 0.008 of that of the PLA resin, respectively, in order to maintain clarity. To accomplish this, the PLA resin is blended with 40-60% of another polymer, such as an acrylate polymer, to adjust the refractive index of the polymer blend to more closely resemble that of the impact modifier. This approach is less than desirable in many cases for several reasons. It entails extra blending steps and associated costs. The acrylate polymer is not derived from annually renewable resources, nor is it compostable, so the environmental advantages of using the PIA resin become diluted.

WO 2005/055352 describes the effect of adding core-shell-type impact modifiers to neat PLA resin (see, e.g., Table 2). Haze values tend to be quite high (as measured on 3-mm thick injection molded samples), which effect WO 2005/085352 attributes to the difference in refractive index between the PLA resin and the impact modifier. In some cases, impact strength is surprisingly small, too, despite the presence of quite large (15% by weight) amounts of the impact modifier. For instance, comparative example 7 of the reference describes a blend of a neat PLA resin and an acrylic-type impact modifier, Paraloid™ 355M. This blend not only has a haze of over 45% (on a 3-mm thick sample), but also exhibits a Charpie impact strength of only 4.7 kJ/m². In this blend, the impact modifier particles are providing little improvement in impact strength (despite the high level of the particles) while producing a highly opaque part.

WO 2005/085352 suggests that good clarity can be obtained only if there is a close match between the refractive index of the bulk polymer matrix and the impact modifier particles. For any particular resin, particularly a neat PLA resin, this approach in effect restricts the choice of impact modifier to a very narrow range, and may exclude a wider range of commercially available materials that may be more effective at increasing impact strength. It has been found that impact modifiers within that narrow range of refractive index may or may not provide good impact properties when used in reasonable amounts. Further, it has been found that impact modifiers having very similar refractive indices often perform quite differently in terms of the opacity they produce in a PLA resin blend, suggesting that some attribute other than or in addition to refractive index is required in order to deliver a clear impact modified PLA resin blend.

This invention is an impact modified polylactide resin comprising a continuous polymer matrix having impact modifier particles dispersed therein, wherein a) at least 90% by weight of the continuous polymer matrix is one or more polylactides, b) the impact modifier is distributed within the polylactide resin as larger particles or agglomerates or both having a diameter of at least 150 nanometers and smaller particles or agglomerates having a diameter of from 10 to 150 nanometers, such that upon imaging a planar surface of the blend using transmission electron spectroscopy, 1) the imaged area of the larger particles and agglomerates constitute from 60 to 95% of the total area of the imaged particles and 2) the number average particle size of all particles and agglomerates is no greater than 210 nanometers; and further wherein c) the impact modifier is a core-shell rubber characterized by having (1) a crosslinked rubbery core having a $T_g$ of less than $-10°$ C.;

(2) a shell of a polymer having a $T_g$ of at least 50° C.; and (3) a refractive index in the range of from 1.430 to 1.485.

Applicants have found that particle size of the core-shell modifier as distributed in the resin is important for obtaining a useful combination of good impact strength and low haze (or, conversely, good clarity). If the particles are distributed within the resin matrix as described, it is possible to obtain a significant increase in impact strength over the unmodified PLA resin, and at the same time obtain a product having low haze. When impact modifier particles are distributed within the polymer matrix in this manner, the refractive index of the impact modifier becomes less critical to obtaining good optical clarity, and as a result a wider range of impact modifiers, having a wider range of refractive indices, can be used successfully.

The invention is also a thermoformed article made from the foregoing blend, which thermoformed article has a Dart impact strength of from 4 to 20 ft-lb (5.4-27 J) and a haze of no greater than 12%. Haze is measured for purposes of the invention according to ASTM D1003-00, with all haze values being normalized to an 18 mil (460±5 micron) sample thickness. Details pertaining to a suitable method for measuring haze are described below with regard to the examples.

For the purposes of this invention, the terms "polylactide", "polylactic acid" and "PLA" are used interchangeably to denote polymers having at least 50% by weight of polymerized lactic acid repeating units (i.e., those having the structure —OC(O)CH(CH$_3$)—), irrespective of how those repeating units are formed into the polymer. The PLA resin preferably contains at least 80%, at least 90%, at least 95% or at least 98% by weight of those repeating units.

The PLA resin may further contain repeating units derived from other monomers that are copolymerizable with lactide or lactic acid, such as alkylene oxides (including ethylene oxide, propylene oxide, butylene oxide, tetramethylene oxide, and the like) or cyclic lactones or carbonates. Repeating units derived from these other monomers can be present in block and/or random arrangements. These other repeating units suitably constitute up to about 10% by weight of the PLA resin, preferably from about 0 to about 5% by weight, especially from about 0 to 2% by weight, of the PLA resin.

The PLA resin may also contain residues of an initiator compound, which is often used during the polymerization process to provide control over molecular weight. Suitable such initiators include, for example, water, alcohols, polyhydroxy compounds of various types (such as ethylene glycol, propylene glycol, polyethylene glycol, polypropylene glycol, other glycol ethers, glycerine, trimethylolpropane, pentaerythritol, hydroxyl-terminated butadiene polymers and the like), polycarboxyl-containing compounds, and compounds having at least one carboxyl and one hydroxyl group (such a lactic acid or lactic acid oligomer). The initiator residue preferably constitutes no more than 10%, especially no more than 5%, and especially no more than 2% of the weight of the PLA resin, except in the case of a lactic acid or lactic acid oligomer, which can constitute any proportion of the PLA resin.

The PLA resin may contain long-chain branching. Long-chain branching can be introduced in the PLA resin in various ways, such as by reacting carboxyl groups on the PLA resin with epoxide groups that are present on an acrylate polymer or copolymer. The acrylate polymer or copolymer is characterized in being a solid at 23° C., containing an average of from about 2 to about 15 free epoxide groups/molecule (such as from about 3 to about 10 or from about 4 to about 8 free epoxide groups/molecule), and being a polymerization product of at least one epoxy-functional acrylate or methacrylate monomer, preferably copolymerized with at least one additional monomer. The acrylate polymer or copolymer suitably has a number average molecular weight per epoxide group of about 150 to about 700, such as from 200 to 500 or from 200 to 400. The acrylate polymer or copolymer suitably has a number average molecular weight of from 1000 to 6000, such as from about 1500 to 5000 or from about 1800 to 3000. Other approaches to introducing long-chain branching are described in U.S. Pat. Nos. 5,359,026 and 7,015,302 and WO 06/002372A2.

A preferred PLA resin is a random copolymer of L-lactic acid and D-lactic acid, a block copolymer of L-lactic acid and D-lactic acid, or a mixture of two or more of these, in each case optionally containing residues of an initiator compound and/or branching agent. The preferred PLA resin contains at least 95%, especially at least 98% by weight repeating lactic acid units.

The lactic acid repeating units in the PLA resin may be either the L- or D-enantiomer, or mixtures thereof. The ratio of the lactic acid enantiomers and the manner in which they are copolymerized (i.e., randomly, block, multiblock, graft and like) influence the crystalline behavior of the polymer. As a result, a PLA resin may be an amorphous type, or a semi-crystalline type. For purposes of this invention, a PLA resin blend is considered to be amorphous if it contains no more than 10 J/g of PLA crystallites when fully crystallized. Crystallinity is conveniently measured using differential scanning calorimetry (DSC) methods. A convenient test protocol for making DSC measurements is to heat a 5-10 milligram sample from 25 to 225° C. at 20° C./minute under air, on a Mettler Toledo DSC 821e calorimeter running Star V. 6.0 software, or similar apparatus.

PLA resins containing 8% or more of each enantiomer tend to form more amorphous structures. Amorphous grades of PLA resins containing from 75 to 92% of one lactic acid enantiomer and from 8 to 25% of the other lactic acid enantiomer are particularly suitable PLA resins for use in this invention. One type of PLA resin of interest is an amorphous grade in which from 85 to 92% of the repeating lactic acid units are of one enantiomer and form 8 to 15% of the repeating lactic acid units are of the other enantiomer.

Semi-crystalline grades of PLA resins can also be used. Semi-crystalline grades of PLA resins of particular interest herein are those that contain more than 10 J/g and up to about 50 J/g, especially up to 45 J/g and most preferably up to 40 J/g, by weight of PLA crystallites when fully crystallized. Such semi-crystalline grades of PLA resins tend to be formed when the PLA resin is a copolymer in which from 92 to 99.5%, preferably from 92 to 99%, especially from 92 to 98.5%, of the repeating lactic acid units are of one enantiomer and from 0.5 to 8%, preferably from 1 to 8%, especially from 1.5 to 8% of the repeating lactic acid units are of the other enantiomer.

PLA resins in which one enantiomer or the other constitutes more than 98.5% by weight of the repeating lactic acid units readily form highly crystalline materials, and may be difficult to form into clear articles. Accordingly, PLA resins of those types may be less preferred if clear parts are to be formed.

Blends of two or more PLA resins can be used, for example, to obtain a desired crystallinity for the blend or to obtain a desired molecular weight distribution.

The amount of crystallization that forms in any particular part made from a PLA resin will depend to some extent on the resin grade itself, the presence of nucleating agents and/or plasticizers, and the thermal and processing history of the part. Heating the part, during or following its manufacture, to a temperature between the glass transition temperature of the PLA resin and its crystalline melting temperature will tend to promote the formation of crystallites, particularly in semi-crystalline and highly crystalline grades. Orienting the polymer during processing can also promote crystal formation. The extent of crystallization in any particular part will depend on all of these factors. In general, the crystallinity of a part of the invention is preferably less than 50 J/g of PLA resin, preferably less than 45 J/g and especially less than 40 J/g of PLA resin, in order to minimize haze due to crystallite formation within the PLA resin matrix.

The molecular weight of the PLA resin is sufficiently high that the PLA resin is melt-processable. Number average molecular weights in the range from 10,000 to 200,000 (prior to branching, if any) are generally suitable. Number average molecular weights of about 30,000 to 100,000 prior to branching (if any) are more preferred. Weight average molecular weights are preferably such that the $M_w/M_n$ ratio is in the range of 1.5 to about 4.0.

The PLA resin can be formed by polymerizing lactide. Lactide is a dimeric form of lactic acid, in which two lactic acid molecules are condensed to form a cyclic diester. Like lactic acid, lactide exists in a variety of enantiomeric forms, i.e., "L-lactide", which is formed from two L-lactic acid molecules, "D-lactide", which is formed from two D-lactic acid molecules, and "meso-lactide", which is formed from one L-lactic acid molecule and one D-lactic acid molecule. In addition, 50/50 mixtures of L-lactide and D-lactide that have a melting temperature of about 126° C. are often referred to as "D,L-lactide". Any of these forms of lactide, or mixtures thereof, can be polymerized to form a PLA resin for use in this invention. The L/D ratio in the PLA resin is controlled through the ratio of these enantiomeric forms of lactide that are used in the polymerization. In an especially preferred process, mixtures of L-lactide and meso-lactide are polymerized to form a polymer having a controlled level of D-lactic acid enantiomeric units. Suitable processes for polymerizing lactide to form PLA having controlled L/D ratios are described, for example, in U.S. Pat. Nos. 5,142,023 and 5,247,059, both incorporated herein by reference.

The blend of the invention also contains dispersed core-shell rubber particles. The core-shell rubber particles are characterized by their refractive index, in having a rubbery core encapsulated by at least one shell material and in terms of their particle size distribution.

The refractive index of the core-shell rubber particles is from 1.430 to 1.485, and is especially from 1.440 to 1.480. An especially preferred core-shell rubber particle has a refractive index of from 1.444 to 1.474. As discussed in more detail below, the range of refractive index that is useful may be broader or narrower, depending on the particle size distribution of the core-shell rubber particles, as dispersed in the PLA matrix. Mixtures of different core-shell rubber particles can be used, if their weight average refractive index falls within these ranges.

The core-shell rubber particle contains at least one core portion which is a rubbery material having a $T_g$ of less than −10° C., and at least one shell portion that has a $T_g$ of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked.

The rubber core suitably constitutes from 50 to 90%, especially from 50 to 85% of the weight of the core-shell rubber particle.

The core-shell rubber may contain, in addition to the aforementioned materials, a central portion which is encapsulated by the rubber core. The central portion may be a hard ($T_g>0°$ C., preferably >50° C.) or soft ($T_g<0°$ C., preferably <−20° C.) polymer.

The composition of the core-shell rubber is selected such that (1) the particles have a refractive index as stated before, and (2) the particles contain core and shell portions having $T_g$ values as described before. Additionally, the shell portion is preferably compatible with a PLA resin, to allow a reasonably uniform dispersion of the impact modifier into the PLA polymer. Core-shell rubbers made up of acrylic polymers tend to exhibit the required refractive index and compatibility, and are therefore preferred.

The rubbery core is preferably a polymer or copolymer of a lower alkyl acrylate such as n-butyl-, ethyl-, isobutyl- or 2-ethylhexyl-acrylate. Homopolymers of such lower alkyl acrylates are suitable rubbery core materials. The rubbery core polymer optionally contains up to 20% by weight of other monounsaturated or conjugated dienic copolymerized monomers such as styrene, vinyl acetate, vinyl chloride, methyl methacrylate, butadiene, isoprene, and the like and optionally up to 5 mole-% of a crosslinking polyunsaturated monomer having two or more sites of approximately equal reactivity, such as ethylene glycol diacrylate, butylene glycol dimethacrylate, divinylbenzene, and the like. It also optionally contains up to 5 mole-% of a graft-linking monomer having two or more sites of unsaturation of unequal reactivity, such as diallyl maleate, monoallyl fumarate, allyl methacrylate, and the like, at least one of the reactive sites being non-conjugated.

The shell polymer, which is optionally chemically grafted or crosslinked to the core rubbery stage, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, and vinyl chloride, methyl acrylate, ethyl acrylate, butyl acrylate, and the like. The molecular weight of the grafted shell polymer is generally between 20,000 and 500,000.

The core-shell rubber particles are distributed within the polylactide resin as single particles, agglomerates of two or more single particles, or as both single particles and agglomerates. The dispersed core-shell rubber will include larger particles or agglomerates (or both) having a diameter of at least 150 nanometers. A portion of the dispersed core-shell rubber will be in the form of smaller particles or agglomerates having a diameter of from 10 to 150 nanometers. The distribution of the particles and agglomerates in the PLA resin is such that, upon imaging a planar surface of the blend using a suitable microscopic method, 1) the imaged area of the larger (i.e., 150 nanometer and larger) particles and agglomerates constitute from 60 to 95% of the total area of the imaged particles and 2) the number average particle size of all particles and agglomerates is no greater than 210 nanometers.

The manner in which the particles are distributed within the PLA matrix is conveniently determined using a microscopic method capable of resolution to approximately 10 nanometers or less. Transmission electron microscopy is a suitable method.

Using transmission electron microscopy, a planar surface of the sample is prepared. The surface should have an area sufficient to image 1000 or more of the dispersed core-shell rubber particles and/or agglomerates, in order to obtain a representative sampling of the particles. An image area of about 625 to 2500 square microns or larger is generally sufficient to image a representative number of dispersed particles. Multiple smaller surfaces can be examined if needed to provide the requisite sample surface area. A suitable sample thickness is from 60 to 70 nanometers. The sample may be stained in order to improve contrast between the PLA resin matrix and the dispersed particles. Ruthenium tetroxide and various osmium compounds are suitable stain materials. The samples are conveniently imaged using a transmission electron spectrometer such as a Hitachi H-600 model or equivalent, at an accelerating voltage of 100 kV. The sample can be deposited onto a 400 mesh copper grid with hexagonal openings for investigation.

Images that are collected from the TEM process are analyzed to determine the diameters of the dispersed core-shell rubber particles. A suitable computer program for conducting this analysis is Image-Pro Plus software for Windows®, version 4.5.1.22 (available from Media Cybernetics, Inc.). Single particle mean diameters are conveniently calculated as the average lengths of the diameters measured at two-degree intervals joining two outline points and passing through the centroid. Mean diameters for agglomerated particles are measured as the average feret length, which is calculated as the average distance measured of the approach of two parallel lines at two degree intervals around the outside of the agglomerate space. Agglomerates are defined, for purposes of this analysis, as a group of two or more particles that are either touching or which are separated by a distance of no more than one-half the average diameter of the single particles.

After diameters are determined as just described, the cumulative area ($A_s$) (as appears in the TEM image) of the particles or agglomerates having diameters of from 10 to less than 150 nanometers is calculated. The cumulative area ($A_l$) of the particles or agglomerates having diameters of 150 nanometers or greater is then calculated. In blends according to the invention, from 60 to 95% of the combined area of all particles and agglomerates is made up of the larger (150+ nm) particles and agglomerates, i.e.;

$$A_l/(A_l+A_s)=0.60-0.95.$$

It has been found that when the core-shell rubber particles are distributed as described above, a good balance of impact strength enhancement and low haze (high clarity) can be achieved, using moderate levels of the core-shell rubber particles. When the ratio $A_l/(A_l+A_s)$ is less than 0.60, the core-shell rubber provides little enhancement in impact strength. When the ratio is greater than 0.95, haze increases very significantly. The ratio $A_l/(A_l+A_s)$ is preferably from 0.60 to 0.90.

Haze is also related to the number average particle size of the particles and/or agglomerates as dispersed in the PLA resin matrix. When the number average size of particles and agglomerates exceeds about 210 nanometers, it becomes more difficult to produce a material having low haze. A preferred number average size of the particles and agglomerates is from 140 to 210 nanometers. When the number average particle size is smaller, it has been found that the refractive index of the core-shell rubber can diverge more from that of the PLA resin. Thus, for example, a core-shell rubber having a refractive index as much as 0.03 units different from that of the PLA resin can be used, if number average particle size is small enough (although the $A_l/(A_l+A_s)$ value must remain above 0.60 as discussed before, to provide impact strength enhancement).

Such a particle size distribution within the PLA matrix is a function of both the primary particle size of the core-shell rubber particles (as received, prior to blending), as well as to the extent to which the core-shell rubber particles become dispersed in the PLA matrix.

Very small particulates tend to form agglomerates which have a diameter of from 1.5 to 10 times that of the primary (unagglomerated) single particles. The agglomeration may be due to van der Waals or electrostatic forces, or other mechanisms. These particulates tend to be very difficult to break up when the core-shell rubber particles are dispersed into the PLA resin. As a result, the core-shell rubber particles tend to be dispersed as a mixture of single particles and larger agglomerates, unless very high shear conditions are used (such as in injection molding processes).

Therefore, the particle size distribution described before can be achieved in at least two ways. If the particles are dispersed very efficiently within the PLA matrix (i.e, the dispersed particles are present mainly as primary particles with few agglomerates), the particle size distribution of the starting core-shell rubber can be selected to match or nearly match the desired particle size distribution of the particles as dispersed. Thus, a bi-modal core-shell rubber having a first fraction of smaller particles of 10 to less than 150 nanometers and a second fraction of larger particles of 150 nanometers and larger, especially 150 to 1000 nanometers, can be used herein.

Alternatively, a core-shell rubber having particles mainly having a primary particle size smaller than 150 microns can be used, with less than complete dispersion so that some of the particles are dispersed into the PLA resin matrix in the form of agglomerates of 150 microns or larger.

Methods for making core-shell rubbers are well-known and are described, for example, in U.S. Pat. Nos. 3,655,825, 3,678,133, 3,668,274, 3,796,771, 3,793,402, 3,808,180, 3,843,735, 3,985,703 and 6,989,190. A suitable method is a two-stage polymerization technique in which the core and shell are produced in two sequential emulsion polymerization stages.

For example, there is first prepared a monomer charge comprising an aqueous emulsion containing about 10 percent to about 50 percent by weight of core monomers, and from about 0.2 to about 2.0 percent by weight of a suitable emulsifier. From about 0.05 to about 2.0 percent by weight based on the weight of monomer mixture of a water-soluble catalyst such as an ammonium, sodium, or potassium persulfate, hydrogen peroxide, or a redox system, such as a mixture of a persulfate with an alkali metal bisulfite, bisulfate, or hydrosulfite, is introduced, and the mixture is then heated to a temperature of from about 40° C. to about 95° C. for a period of from about 0.5 to about 8 hours to produce rubbery core particles. The shell monomers and additional initiators, water and surfactants can be continuously added or be introduced in "shots" over an additional 0.5 to 8 hours, under polymerization conditions, to form the shell portion of the core-shell rubber. A seed latex may be present at the start of the process to help control particle size. Suitably such seed latexes have a particle size of less than about 500 Angstroms and comprise polystyrene, polyalkyl acrylate, polymethylmethacrylate, or other suitable thermoplastic or elastomeric polymer. The seed latexes are generally employed in an amount of about 20 percent or less based on core monomer weight.

Suitable emulsifiers include anionic types, such as salts of carboxylic acids having from 2 to 22 carbons, the sulfates or sulfonates of alcohols having from 6 to 22 carbons, or alkyl phenols; non-ionic types such as the addition products of alkylene oxides to fatty acids, amines, or amides; a combination of the foregoing anionic and non-ionic emulsifiers; or cationic types such as a quaternary ammonium-containing compound.

Agents to control the molecular weight, such as alkyl mercaptans, can be present in either or both stages of the polymerization reaction. In addition, a buffer to control the pH of the emulsion polymerization medium is additionally desirable.

The core-shell rubbers may be prepared directly at the aforementioned particle sizes, but it is also possible to prepare different core-shell rubbers having different particle sizes and blend them together to obtain a distribution of smaller and larger particles. Broad or multimodal particles sizes can be obtained during the emulsion process by agglomeration techniques such as are described in U.S. Pat. Nos. 6,989,410; 6,884,844; 6,723,764; 6,723,764; 5,442,012; 5,312,575 and 4,419,496.

The impact polymer particles can be isolated from the product emulsion by a variety of techniques such as spray-drying, salt coagulation, acid coagulation, freeze drying, mechanical or shear coagulation and combinations of these methods.

Commercially available core-shell rubbers that are especially suitable are sold as Paraloid™ KM 355 and Paraloid™ BPM 500 (formerly Paraloid™ KM 365) by Rohm and Haas Company. Paraloid KM 355 contains approximately 83% by weight of a acrylate rubber core, approximately 17% by weight of a polymethylmethacrylate shell with a $T_g$ above 50° C., and has a refractive index of 1.472. Paraloid BPM 500 contains approximately 83% by weight of a acrylate rubber core with a $T_g$ of −44° C., approximately 17% by weight of a polymethylmethacrylate shell with a $T_g$ above 50° C., and has a refractive index of 1.471. Mixtures of the Paraloid™ KM 355 or BPM 500 material with other acrylic/acrylate core-shell rubbers such as Paraloid™ EXL 2330, Paraloid™ KM 334 and Paraloid™ KM 342B are also useful, particularly when the Paraloid™ KM 355 or Paraloid™ BPM 500 material constitutes at least 70% of the total weight of the core-shell rubber.

The blend of the invention is formed by mixing the core-shell rubber particles into molten PLA resin, such that the PLA resin forms a continuous phase and the core-shell rubber particles become a disperse phase. The core-shell rubber may be mixed as a dry blend with PLA resin, followed by a melt-blending step, or else the core-shell rubber particles can be blended into a molten PLA resin. An extruder is a convenient apparatus upon which to perform the blending operation. The blending step may be incorporated into a melt-processing operation which forms articles (such as sheet or a thermoformed product) from the newly-formed blend. Alternatively, the blending step is conducted separately from other melt-processing operations. In the latter case, the blend is typically cooled below the softening temperature of the PLA resin and formed into particulates for easy storage and subsequent processing.

In cases in which some agglomeration of the core-shell rubber particles is desired (for instance, the number average particle size of the core-shell rubber particles is very small, or the fraction of particles above 150 nanometers in diameter is too small), it is preferred to avoid very high shear conditions (such as are sometimes experienced during injection molding processes), in order to obtain a sufficient amount of agglomeration of the core-shell rubber particles and maintain high impact strength.

Preferably, the ratio of PLA resin and core-shell rubber used to make the blends of the invention are selected such that the blend has a Dart impact strength of at least 4 ft-lb (5.4 J) and a haze value of no greater than 12%. Such properties may be achieved when the blend contains from 1 to 12% by weight of the core shell polymer. These values are more typically achieved when the blend contains from about 3 to about 12% of the core-shell rubber, especially from about 5 to about 10%.

A preferred blend of the invention has a Dart impact strength of at least 6 ft-lb (8.1 J) and a haze of no greater than 10%. A more preferred blend of the invention has a Dart impact strength of from 8 to 15 ft-lb (10.8 to 20 J) and a haze of no greater than 10%. An even more preferred blend of the invention has a Dart impact strength of at least 9 ft-lb (12.1 J) and a haze of no greater than 8%.

Dart impact strengths are conveniently measured, for purposes of this invention, according to ASTM D1709-98.

Haze is measured by ASTM D1003-00 using a BYK Gardner Haze-Gard or equivalent instrument, with data being normalized to an 18 mil (460±5 micron) sample. % Haze is equal to 100%-% transmittance.

Haze measurements will typically include a contribution due to surface imperfections and irregularities, and another contribution due to the properties of the sample itself. The surface contribution to the haze measurements can be quite significant if the surface is very rough or irregular. The presence of the impact modifier will have essentially no effect on surface haze, as the core-shell rubber particles are mainly too small to affect surface roughness. Surface effects on the haze measurements can be minimized by testing parts having smooth surfaces. Another way to eliminate the surface contribution to haze measurements is to immerse or coat the sample with a liquid having approximately the same refractive index as the sample. Haze values reported herein are made using a sample with a smooth surface, such that the surface contribution to the haze measurement is small but not zero.

In making the blend of the invention, an additional resin may be blended with the PLA resin in small quantities (such as up to 10%, preferably up to 5%, of the combined weight of the PLA resin and the additional resin). The additional resin is preferably miscible with the PLA resin, so that the final product has low haze. Suitable additional resins include methyl methacylate polymers and copolymers such as are described in WO 2005/085352. Graft copolymers may be included to help compatibilize the additional resin with the PLA resin. Preferably, no additional resin is present.

The blend of the invention is particularly suitable for making amorphous and semi-crystalline sheet and thermoformed articles. Semicrystalline articles preferably have a crystallinity of no greater than 40 J/g, especially no greater than 30 J/g, and have very small crystallites in, order to maintain clarity.

The extent to which a PLA resin will crystallize can be controlled through (1) the selection of PLA resin, as described before, (2) the presence or absence of nucleating agents and (3) control of processing conditions, in particular the amount of time during processing at which the article is maintained at a temperature between its $T_g$ and its crystalline melting temperature. Highly amorphous grades of PLA resin will crystallize only slightly under any conditions. More semi-crystalline grades will tend to crystallize more readily, so temperature control during processing is more important to maintain the product in an amorphous or lightly crystalline form.

Amorphous sheet is conveniently prepared by forming a melt of the polymer, at a temperature above its crystalline melting temperature to melt out all crystallites, extruding or casting the melt to form a sheet, and quickly cooling the sheet to below its $T_g$ before significant crystallinity develops. The sheet may be stretched or rolled post-extrusion to adjust its dimensions, particularly its thickness. Amorphous sheet generally is not highly oriented.

A semi-crystalline sheet can be prepared in a similar manner, except that crystallinity is induced by 1) maintaining the sheet between the Tg and its crystalline melting temperature for a period of time sufficient for crystallinity to develop, 2) orienting the sheet or 3) some combination of both 1) and 2).

An amorphous or semi-crystalline sheet can be thermoformed to form containers such as cups, bottles, dishes and the like. A sheet having a thickness of about 5 to about 50 mils, especially from 10 to 30 mils, is generally suitable for most thermoforming applications.

The sheet is thermoformed by bringing it to a temperature somewhat above its glass transition temperature but below its crystalline melting temperature to soften it, positioning the softened sheet over a male or female mold, and drawing and/or pressure forming the sheet on the mold to form a molded part. The mold is most typically a female mold. The sheet is suitably heated to a temperature from about 100° C. to about 160° C. and especially from about 110° C. to about 140° C. in the softening step. Multiple formed parts can be made simultaneously or sequentially from a single sheet. The mold may be heated to a temperature above the glass transition temperature but below the crystalline melting temperature of the sheet (such as from 80 to 160° C., especially from 80 to 140° C.). It is also possible to use a "cold" mold which is at or below the glass transition temperature of the resin. If the mold is above the $T_g$ of the resin, it may be necessary to limit the residence time of the part on the mold in order to prevent too much crystallinity from developing. The development of too much crystallinity and/or large Crystallites tend to create opacity in the thermoformed product. Some crystallinity is generally produced during the thermoforming process due to the temperature at which the process is conducted. Crystallinity can also be induced to some degree by the stretching of the sheet as it is thermoformed. The crystallinity is preferably not greater than 40 J/g, more preferably not greater than 35 J/g and especially not greater than 30 J/g, in order to avoid forming excessive haze. The thermoformed product may be amorphous, i.e., contain less than 10 J/g crystallinity.

The thermoforming process can be conducted using conventional types of thermoforming apparatus. Examples of such apparatus and general methods are described, for example, by Throne in "Thermoforming Crystallizing Poly (ethylene Terephthalate) (CPET)", *Advances in Polymer Technology*, Vol. 8, 131-146 (1988). Drawing is preferably performed using vacuum. The mold may include a male half that is inserted into the female half during the process to provide male mold forming. It may also be desirable to prestretch the sheet; if so, a pressure cap or other prestretching device may be used and actuated prior to drawing the sheet into the mold. Once the part is formed and cooled below its $T_g$, it is demolded and separated from other parts and trimmed if necessary. Various downstream operations, such as applying graphics or labels, assembly to other parts, packaging and the like can be performed if needed, depending on the type of part and its intended use.

Bottles and other containers can be made in a stretch blow molding process or an injection stretch blow molding process. An injection stretch blow molding process is described, for example, in U.S. Pat. No. 5,409,751 and WO 2006/002409. The process involves first forming a preform, or "plug", which is hollow and has dimensions a fraction of those of the final container. The preform is molded into a container by inserting it into a mold, and stretching it both axially (i.e. along its length) and radially. The axial stretching is done mechanically by inserting a pusher rod into the preform and mechanically extending it towards the bottom of the mold. Radial stretching is accomplished by injecting a compressed gas into the plug, thereby forcing the resin outward to contact the interior surface of the mold. Typically, a preliminary radial stretch is preformed by injecting a first increment of gas. This makes room for the stretcher rod, which can then be inserted. The preform is then stretched and immediately afterward is blown with more gas to complete the blow molding operation.

As with thermoforming operations, some crystallinity is often introduced to the resin during the stretch blow molding process due to the temperature regime and mechanical stretching of the polymer. As before, the article is preferably amorphous or contains less than 40, more preferably less than 35, and especially less than 30 J/g, of crystallinity in order to maximize its clarity.

The following examples illustrate the invention, but are not intended to it in any way. All parts and percentages are by weight unless otherwise indicated.

EXAMPLES 1-11 AND COMPARATIVE SAMPLES A-G

Comparative Sample A is prepared by extruding a commercial grade of PLA resin having a D-enantiomer content of 2% and a relative viscosity of 4.0 on a Rand Castle sheet line, to form an amorphous sheet having a thickness of about 15 mils (~380 microns). The haze of the extruded sheet is measured in air according to ASTM D1003-00 using a BYK Gardner Haze-Gard Plus instrument. All haze values reported are normalized to an 18 mil (~460 micron) sheet thickness. The sheet sample evaluated for haze has a very smooth surface, in order to reduce the contribution of surface effects to the haze measurements. However, surface effects will make a small contribution to the haze measurements under these conditions.

Impact testing is measured according to ASTM D1709-98. Testing is conducted on 14-17 mil (~335-432 micron) thick sheet sample with 6" by 6" (15×15 cm) dimensions using a Kayeness Inc., Model #D2085AB dart drop tester. The test uses a single dart configuration set at one of the two different heights using a 2-inch (5-cm) diameter hemispherical head, with the height of the dart being selected based upon the expected impact-strength of the test sample. The sample sheet is clamped securely in a pneumatic ring at the base of the drop tower. The dart is loaded with appropriate weight and released to drop onto the center of the test specimen, and the test result (pass/fail) is recorded. If the specimen cracks or fractures under the applied load the sample is classified as failed. If the specimen does not crack or fracture under the applied load the sample is classified as pass. The weight is increased or decreased to move from a pass to fail condition and back. Then the results are used to calculate the energy where 50% of the test specimens are estimated to fail under the impact as described in the ASTM method.

Tensile strength and elongation are evaluated according to ASTM D638-00.

Results of this testing are as reported in Table 1.

Masterbatch A is prepared by melt blending 60 parts by weight of the same PLA resin as used in Comparative Sample A with 40 parts by weight Paraloid™ KM 365 (now Paraloid™ BPM 500) core-shell rubber in a twin screw extruder. The PLA resin and core-shell rubber are dried at 40-60° C. for 48 hours before blending. The resulting blend is pelletized for let down into more of the same PLA resin. Paraloid™ KM 365 (Paraloid BPM 500) particles contain about 17.1% of a polymethyl methacrylate shell and 82.9% of an acrylate rubber core having a $T_g$ of about −44° C. Its refractive index is 1.471, measured as outlined in ASTM D542-00, using an Abbe refractometer and a saturated zinc chloride solution in water as the contacting liquid. Refractive index is measured on films 1 mm thick, which are produced by melting core-shell rubber particles in a Carver press at 150° C. to 175° C. and a pressure of 200-250 psi (1380-1775 kPa).

Masterbatch B is prepared in the same manner, using 60 parts by weight of the PLA resin and 40 parts by weight Paraloid™ KM 342B core-shell rubber. Paraloid™ KM 342B particles contain about 7.7% of a polymethyl methacrylate shell and 92.3% of an acrylate rubber core having a $T_g$ of about −44° C. Its refractive index is 1.485.

Masterbatch C is also made in the same way, using Paraloid™ KM 334 core-shell rubber at the same concentration. Paraloid™ KM334 particles contain about 24.9% of a polymethyl methacrylate shell and 75.1% of an acrylate rubber core having a $T_g$ of about −44° C. Its refractive index is 1.470.

Masterbatch D is also made in the same way, using core-shell rubber designated as PD1046 (available from Arkema) at the same concentration. PD 1046 has an estimated refractive index of 1.478.

Masterbatch E is also made in the same way, using Paraloid™ EXL 2330 core-shell rubber at the same concentration. Paraloid™ EXL 2330 particles contain about 23% of a polymethyl methacrylate shell and 77% of an acrylate rubber core. Its refractive index is 1.480.

Masterbatch F is also made in the same way, using Paraloid™ KM 355 core-shell rubber at the same concentration. Paraloid KM 355 particles contain about 17% of a polymethylmethacrylate shell and 83% of an acrylate rubber core. Its refractive index is 1.472.

Masterbatch G is made in the same way as Masterbatch A, except the PLA resin has a D-enantiomer content of 4% and a relative viscosity of 4.0.

A portion of Masterbatch A is dry blended with an additional quantity of the same PLA resin, and the dry blend is extruded through a twin screw extruder. Proportions of starting materials are chosen so the extrudate contains 3% by weight of the core-shell rubber. The extruded blend is then formed into 15-mil thick amorphous sheet (Example 1) on a Rand Castle sheet line. Impact strength and haze are measured in the same manner as for Comparative Sample A.

Tensile strength at break and elongation at break are measured according to ASTM D638-91 on an MTS Systems Qtest™ System III tensile testing device. 4.5" (12.5 cm) dog bone sample having a width of 0.25" (0.63 cm) and a thickness of 0.13"(0.32 cm) are cut from the 15 mil (~380 micron) sheet for the tensile testing. Results are as reported in Table 1.

Example 2 is prepared in the same manner as Example 1, except the ratio of Masterbatch A and additional polymer are such that the product contains 5% by weight of the core-shell rubber. Results of testing are as reported in Table 1.

Examples 3 and 4 are prepared in the same manner as Example 1, except the ratio of Masterbatch A and additional polymer are such that the products contain 7.5% and 10%, respectively, by weight of the core-shell rubber. Results of testing are as reported in Table 1.

Example 5 is prepared in the same manner as Example 1, by dry blending a portion of each of Masterbatch A and Masterbatch B with more of the same PLA resin. The product contains 5 weight percent of the Paraloid™ KM 365 (Paraloid™ BPM 500) core-shell rubber and 0.5% of the Paraloid™ KM 342B core-shell rubber. Haze and impact strength are tested as before, with results as indicated in Table 1.

Example 6 is prepared in the same manner as Example 5, except that the ratios of Masterbatch A, Masterbatch B and additional PLA resin are such that the product contains 5 weight percent of the Paraloid™ KM 365 (Paraloid™ BPM 500) core-shell rubber and 1.0% of the Paraloid™ KM 342B core-shell rubber. Haze and impact strength are tested as before, with results as indicated in Table 1.

Example 7 is prepared in the same manner as Example 1, by dry blending a portion of each of Masterbatches A and C with additional PlA resin. The product contains 5 weight percent of the Paraloid™ KM 365 (Paraloid™ BPM 500) core-shell rubber and 0.5% of the Paraloid™ KM 334 core-shell rubber. Haze and impact strength are tested as before, with results as indicated in Table 1.

Example 8 is prepared in the same manner as Example 5, except the proportions of Masterbatch A, Masterbatch C and additional PLA resin are such that the product contains 5 weight percent of the Paraloid™ KM 365 (Paraloid™ BPM 500) core-shell rubber and 1.0% of the Paraloid™ KM 334 core-shell rubber. Haze and impact strength are tested as before, with results as indicated in Table 1.

Example 9 is prepared in the same manner as Example 1, except Masterbatch F is used instead of Masterbatch A. The product contains 3% by weight of the core-shell rubber. Results of testing are as reported in Table 1.

Example 10 is prepared in the same manner as Example 9, except the ratio of Masterbatch F and additional polymer are such that the product contains 5% by weight of the core-shell rubber. Results of testing are as reported in Table 1.

Comparative Sample B is prepared by extruding a 15-mil (~380 micron) sheet from the PLA resin used in Masterbatch G, without added core-shell rubber, using the same method as described for Comparative Sample A. Haze and impact strength are tested as before, with results as indicated in Table 1.

A portion of Masterbatch G is dry blended with an additional quantity of the same PLA resin, and the dry blend is extruded through a twin screw extruder, as described for Example 1, to form a blend (Comparative Sample G) that contains 5% by weight of the core-shell rubber.

Example 11 is prepared in the same manner as Comparative Sample G, except the ratio of Masterbatch G and additional polymer are such that the product contains 8% by weight of the core-shell rubber. Results of testing are as reported in Table 1.

Comparative Samples C-F are made in the same manner as Example 1, except that Masterbatches B-E, respectively, are let down into more of the same PLA resin to produce sheet in each case containing 5% of the corresponding core-shell rubber particles.

TABLE 1

| Example or Comparative Sample No. | Core-shell rubber Type[1], Loading (wt-%) | % Haze | Dart Impact, ft-lb (J) | Tensile Strength; psi (MPa) | Elongation (%) |
|---|---|---|---|---|---|
| A* | None | 2.7 | 1.9 (2.6) | 7432 (51.2) | 11.1 |
| 1 | A (3%) | 5.1 | 1.8 (2.4) | 6230 (42.9) | 10.5 |
| 2 | A (5%) | 6.4 | 6.5 (8.9) | 4714 (32.5) | 11.6 |
| 3 | A (7.5%) | 8.0 | 9.7 (13.2) | 7788 (53.7) | 6.4 |
| 4 | A (10%) | 9.2 | 14.0 (19.0) | 5915 (40.8) | 14.4 |
| 5 | A (5%), B (0.5%) | 9.5 | 8.7 (11.8) | ND | ND |
| 6 | A (5%), B (1.0%) | 11.8 | 11.5 (15.7) | ND | ND |
| 7 | A (5%), C (0.5%) | 7.5 | 9.0 (12.2) | ND | ND |
| 8 | A (5%), C (1.0%) | 8.9 | 11.7 (15.9) | ND | ND |
| 9 | F (3%) | 6.5 | 9.3 (21.6) | ND | ND |
| 10 | F (5%) | 9.8 | 11.4 (15.5) | ND | ND |
| C* | B (5%) | 29.2 | 14.0 (19.0) | ND | ND |
| D* | C (5%) | 16.8 | 10.2 (13.8) | 5522 (38.1) | 8.5 |
| E* | D (5%) | 8.5 | 1.4 (1.9) | ND | ND |
| F* | E (5%) | 27.5 | 9.7 (13.2) | 6663 (45.9) | 8.0 |
| B* | None | 2.8 | 1.4 (1.9) | ND | ND |
| G* | A (5%) | 6.4 | 1.5 (2.1) | ND | ND |
| 11 | A (8%) | 9.0 | 11.4 (15.5) | ND | ND |

*Not an example of the invention.
[1] A = Paraloid ™ KM 365 (Paraloid ™ BPM 500); B = Paraloid ™ KM 342B; C = Paraloid ™ KM 334, D = PD1046; E = Paraloid ™ EXL 2330; F = Paraloid ™ KM 355.

The particle size distribution of the core-shell rubbers in Examples 2, 8, 10 and 11 and Comparative Samples C through G is determined by transmission electron spectroscopy. A 15-mil (~380 micron) extruded sheet of each blend is cut with a razor blade to form a raised area of about 500 microns on a side. The resulting block is stained for one hour in a sealed glass vial at 0° C. with a 0.5% solution of ruthenium tetroxide. The stained sample is then sectioned to 70 nanometers thickness, and sections are collected onto 400 mesh copper grids with hexagonal openings. The grids are then examined with a Hitachi H-600 transmission electron spectrometer at an accelerating voltage of 100 kV. Digital images are collected and analyzed using Image-Pro Plus software for Windows®, version 4.5.1.22 (available from Media Cybernetics, Inc.) to determine the distribution of the core-shell rubber particles in the PLA matrix in each case. Single particle mean diameters are calculated as the average lengths of the diameters measured at two-degree intervals joining two outline points and passing through the centroid. Mean diameters for agglomerated particles are measured as the average feret length, which is calculated as the average distance measured of the approach of two parallel lines at two degree intervals around the outside of the agglomerate space. Agglomerates are defined, for purposes of this analysis, as a group of two or more particles that are either touching or which are within ½ the average diameter of the single particles. From this data, number average particle size (for primary particles), the maximum of the primary particle size distribution, the area in the image corresponding to the primary particles and clusters having a diameter of less than 150 nanometers ($A_s$), and the area in the image corresponding to the primary particles and clusters having a diameter of 150 microns or more ($A_l$) are all determined. $A_l/(A_s+A_l)$ is calculated from $A_s$ and $A_l$. Results are as indicated in Table 2. Haze and impact data from Table 1 are again reported in Table 2.

TABLE 2

| Ex. Or Comp. Sample No. | No. Ave. Particle Size[1], nm | $A_l/(A_s + A_l)$ | Haze, % | Dart impact, ft-lb (J) |
|---|---|---|---|---|
| 2 | ~150 | 65.1% | 6.5 | 6.5 (8.9) |
| 8 | ~155 | 71.0 | 8.9 | 11.7 (15.9) |
| 10 | ~205 | 89.5 | 9.8 | 11.4 (15.5) |
| 11 | ~160 | 72.6 | 9.0 | 11.4 (15.5) |
| C* | ~128 | 92.4 | 29.2 | 14.0 (19.0) |
| D* | ~141 | 88.3 | 16.8 | 10.2 (13.8) |
| E* | ~56 | 37.2 | 8.4 | 1.4 (1.9) |
| F* | ~219 | 94.7 | 27.5 | 9.7 (13.2) |
| G* | ~135 | 57.4 | 6.4 | 1.5 (2.1) |

*Not an example of the invention.
[1]Number average size of single particles and agglomerates as dispersed in the PLA resin.

The data in Tables 1 and 2 shows how the invention provides a good combination of impact strength and low haze. Comparatives C, D, and F all show that good impact strength can be imparted by core shell particles that do not have the correct particle size distributions, but haze is in excess of 15% in every case. Comparatives E and G show low haze, but the very small particle size rubber particles and the low $A_l/(A_s+A_l)$ ratios in those cases lead to negligible improvement in impact strength.

In contrast, the Examples of the Invention all exhibit haze values of less than 10%, except for Example 6, in which the haze is still less than 12. Examples 2-10 all show a significant increase in impact strength, relative to Comparative Sample A. Example 11 shows a significant increase in impact strength relative to Comparative Sample B. The small amount of core-shell rubber in Example 1 is believed to account for the lack of improvement in impact strength for that material; at that loading and under these processing conditions, it is believed that this core-shell rubber material does not form sufficient agglomerates of >150 nanometers in diameter to provide much impact strength enhancement.

What is claimed is:

1. An impact modified polylactide resin comprising a continuous polymer matrix having from 5 to 10% by weight of impact modifier particles dispersed therein, wherein
   a) at least 90% by weight of the continuous polymer matrix is one or more polylactides,
   b) the impact modifier is distributed within the polylactide resin as larger particles or agglomerates or both having a diameter of at least 150 nanometers and smaller particles or agglomerates having a diameter of from 10 to 150 nanometers, such that upon imaging a planar surface of the blend using transmission electron spectroscopy, 1) the imaged area of the larger particles and agglomerates constitute from 60 to 95% of the total area of the imaged particles and 2) the number average particle size of all particles and agglomerates is no greater than 210 nanometers;
wherein
   the impact modifier is a core-shell rubber characterized by having
   (1) a crosslinked rubbery core having a $T_g$ of less than −10° C.;
   (2) a shell of a polymer having a $T_g$ of at least 50° C.; and
   (3) a refractive index in the range of from 1.430 to 1.485 and further wherein has a dart impact strength of from 4 to 20 ft-lbs (5.4-27 J) and a haze of no greater than 10%.

2. The impact modified polylactide resin of claim 1, wherein the polylactide resin is an amorphous grade.

3. The impact modified polylactide resin of claim 2 wherein the rubbery core is a polymer or copolymer of an acrylic monomer.

4. The impact modified polylactide resin of claim 3 wherein the shell is a polymer or copolymer of a methacrylate ester.

5. The impact modified polylactide resin of claim 4 wherein the rubber core is a polymer or copolymer of butyl acrylate or 2-ethylhexyl acrylate.

6. The impact modified polylactide resin of claim 5 wherein the shell is a polymer or copolymer of methyl methacrylate.

7. The impact modified polylactide resin of claim 1 which has a dart impact strength of from 8 to 15 ft-lb (10.8-20 J) and a haze of no greater than 10%.

8. The impact modified polylactide resin of claim 7 which has a Dart impact strength of at least 9 ft-lb (12.1 J) and a haze of no greater than 8%.

9. A thermoformed article prepared from the impact modified polylactide resin of claim 1.

10. A thermoformed article prepared from the impact modified polylactide resin of claim 4.

11. A thermoformed article prepared from the impact modified polylactide resin of claim 6.

12. A thermoformed article prepared from the impact modified polylactide resin of claim 7.

* * * * *